United States Patent
Buchdunger et al.

(10) Patent No.: US 9,483,035 B2
(45) Date of Patent: Nov. 1, 2016

(54) METHOD FOR INTEGRATING AT LEAST ONE FIELD DEVICE INTO A NETWORK OF AUTOMATION TECHNOLOGY

(75) Inventors: Andreas Buchdunger, Neuenburg (DE); Axel Poschmann, Basel (CH); Emilio Schiavi, Oberwil (CH); Eugenio Ferreira Da Silva Neto, Biel-Benken (CH); Peter Zaretzke, Riedstadt (DE); Thomas Weinschenk, Hartheim (DE); Yuliana Sejati, Lörrach (DE)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 925 days.

(21) Appl. No.: 13/703,055
(22) PCT Filed: May 12, 2011
(86) PCT No.: PCT/EP2011/057666
§ 371 (c)(1), (2), (4) Date: Feb. 13, 2013
(87) PCT Pub. No.: WO2011/154211
PCT Pub. Date: Dec. 15, 2011

(65) Prior Publication Data
US 2013/0211547 A1    Aug. 15, 2013

(30) Foreign Application Priority Data
Jun. 10, 2010 (DE) .................. 10 2010 029 952

(51) Int. Cl.
G05B 11/12 (2006.01)
G05B 11/01 (2006.01)
(Continued)

(52) U.S. Cl.
CPC ......... *G05B 11/012* (2013.01); *G05B 19/0426* (2013.01); *G05B 19/4185* (2013.01);
(Continued)

(58) Field of Classification Search
None
See application file for complete search history.

(56) References Cited

U.S. PATENT DOCUMENTS

| 2005/0071851 | A1 | 3/2005 | Opheim |
| 2006/0059283 | A1* | 3/2006 | Borst ................... G05B 19/042 710/107 |

(Continued)

FOREIGN PATENT DOCUMENTS

| DE | 10208530 A1 | 9/2003 |
| DE | 10234304 A1 | 2/2004 |

(Continued)

OTHER PUBLICATIONS

English translation IPR, Dec. 20, 2012, Geneva.
(Continued)

*Primary Examiner* — Angela Nguyen
(74) *Attorney, Agent, or Firm* — Bacon & Thomas, PLLC

(57) ABSTRACT

A method for integrating at least one field device into a network of automation technology, wherein a plurality of field devices are arranged distributed in an automated plant, wherein accessing of the field devices occurs via a field access unit, which communicates with at least one automation/integration platform and at least one web server of a service provider, wherein the service provider provides for each field device a virtual image of the field device in a database, wherein the service provider transmits to the operator of the automated plant via cloud-computing web services, or Internet based services, automatically or on query, the virtual image of the field device with concrete field device- and application-specific properties at run time (the virtual image is preferably transmitted directly into the field device, and wherein the field device performs its function in the automated plant, as soon as it is integrated into the network.

13 Claims, 1 Drawing Sheet

(51) Int. Cl.
*G05B 19/042* (2006.01)
*G05B 19/418* (2006.01)

(52) U.S. Cl.
CPC ........... *G05B2219/25057* (2013.01); *G05B 2219/25064* (2013.01); *G05B 2219/25101* (2013.01); *G05B 2219/25202* (2013.01); *Y02P 90/18* (2015.11)

(56) References Cited

U.S. PATENT DOCUMENTS

| | | | |
|---|---|---|---|
| 2007/0078696 A1* | 4/2007 | Hardin | G06Q 10/06 705/7.22 |
| 2008/0155066 A1 | 6/2008 | Danz | |
| 2009/0037481 A1* | 2/2009 | Baker | G06F 21/577 |
| 2009/0300607 A1* | 12/2009 | Ferris | G06F 9/45558 718/1 |
| 2009/0319061 A1 | 12/2009 | Schwalbe | |
| 2012/0284377 A1 | 11/2012 | Von Stein | |

FOREIGN PATENT DOCUMENTS

| | | |
|---|---|---|
| DE | 10346478 A1 | 5/2005 |
| DE | 102004007231 A1 | 9/2005 |
| DE | 102004009528 A1 | 9/2005 |
| DE | 112004001775 T5 | 8/2006 |
| DE | 102006005365 A1 | 8/2007 |
| DE | 102008027935 A1 | 12/2009 |
| EP | 1653308 A1 | 3/2006 |
| EP | 2189900 A1 | 5/2010 |
| GB | 2395803 A | 2/2004 |
| WO | WO 02/077732 A1 | 10/2002 |
| WO | WO 2005/033934 A2 | 4/2005 |
| WO | WO 2005/081078 A1 | 9/2005 |
| WO | WO 2009/046095 A1 | 4/2009 |

OTHER PUBLICATIONS

German Search Report, Oct. 6, 2010, Munich.
International Search Rpt, Nov. 8, 2011, The Netherlands.

\* cited by examiner

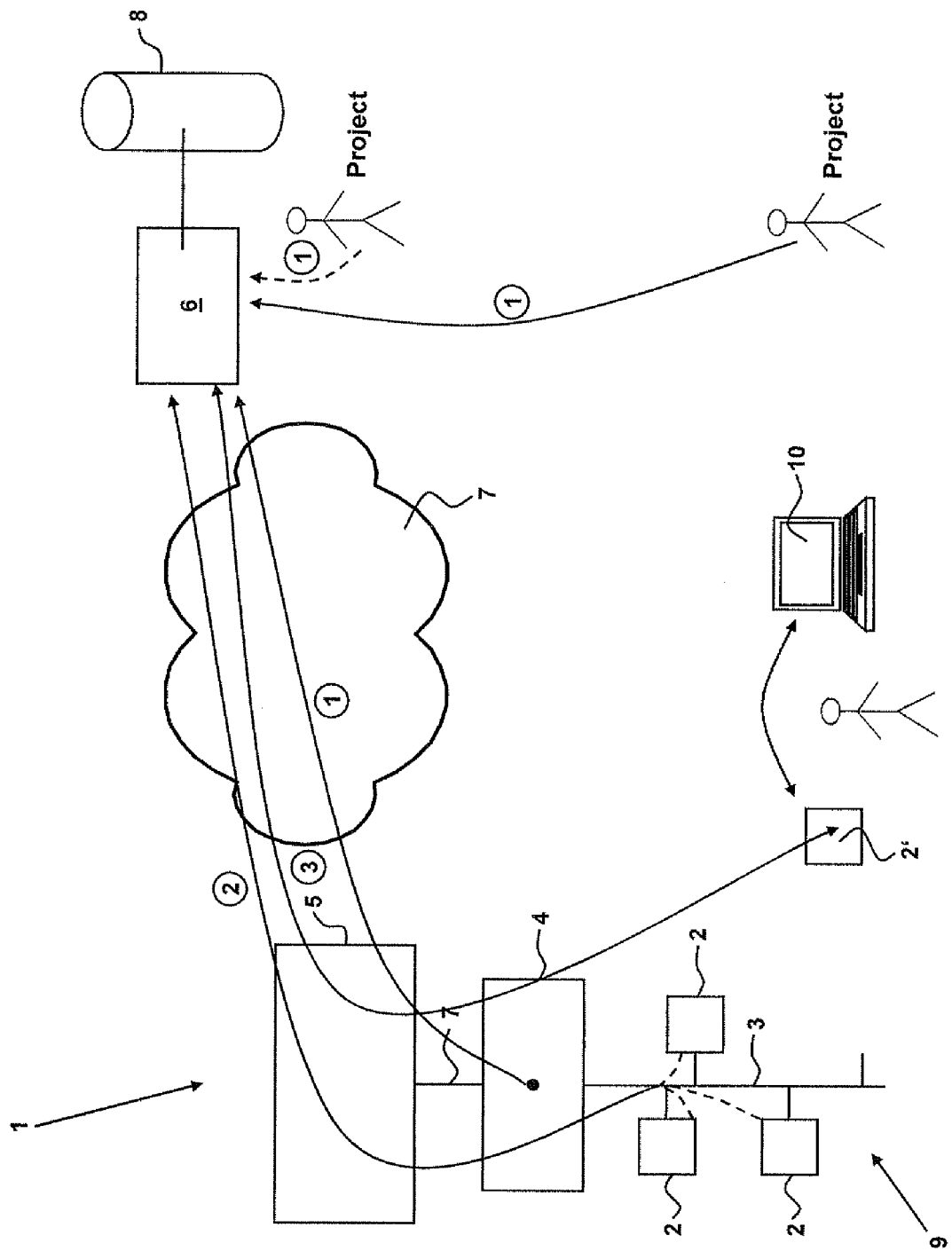

METHOD FOR INTEGRATING AT LEAST ONE FIELD DEVICE INTO A NETWORK OF AUTOMATION TECHNOLOGY

TECHNICAL FIELD

The invention relates to a method for integrating at least one field device into a network of automation technology, wherein a plurality of field devices, which are connected with one another via at least one data bus, on which a bus protocol is running, is arranged distributed in an automated plant, wherein accessing of the field devices occurs via a field access unit, which communicates with at least one automation/integration-platform and at least one web server of a service provider.

BACKGROUND DISCUSSION

In automation technology, especially in process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity. Serving for influencing process variables are actuators, such as, for example, valves or pumps, via which the flow of a liquid in a section of pipeline, or the fill level in a container, can be changed. Referred to as field devices are, in principle, all devices, which are applied near the process and deliver, or process, process relevant information. Thus, in connection with the invention, field devices include also remote I/Os, radio adapters, or, generally, devices, which are arranged at the field level. A large number of such field devices are produced and sold by the firm, Endress+Hauser.

In modern industrial plants, communication between at least one superordinated control unit and the field devices occurs, as a rule, via a bus system, examples being Profibus® PA, Foundation Fieldbus® and HART® bus systems. The bus systems can be embodied both wired as well as also wirelessly. The superordinated control unit serves for process control, process visualizing, process monitoring as well as for start-up and servicing of the field devices and is also referred to as a configuration/management system. Programs, which run self-sufficiently on superordinated units, include, for example, the operating, or servicing, tools, FieldCare of Endress+Hauser, Pactware, AMS of Fisher-Rosemount and PDM of Siemens. Operating tools, which are integrated into control system applications include PCS7 of Siemens, Symphony of ABB and Delta V of Emerson. Included under the term 'servicing of field devices' is especially the configuring and parametering of field devices, however, also diagnosis for early detection of defects in the field devices or in the process.

The integration of field devices into configuration/management systems occurs usually via device descriptions, which enable that the configuration/management systems can detect and interpret the data delivered from the field devices. Already provided, as a rule, by the respective device manufacturers are the device descriptions for each field device type, respectively for each field device type in different applications. In order that the field devices can be integrated into different fieldbus systems, different device descriptions must be created for the different fieldbus systems. Thus there are to name only some examples HART, Fieldbus Foundation and Profibus device descriptions. The number of device descriptions is very large, they correspond to the large number of different field devices, respectively field device types, in the various applications and bus systems. Usually, the device descriptions must be stored in the respective configuration/management system.

For the purpose of creating a universal description language for field devices, Fieldbus Foundation (FF), HART Communication Foundation (HOF) and Profibus Nutzerorganisation (User Organization) (PNO) have created a unified electronic device description language (Electronic Device Description Language EDDL). The EDDL, or the corresponding Electronic Device Description EDD, is defined in the standard, IEC 61804-2.

Integration of field devices into the configuration/management systems occurs online, after installation of the field devices in the automated plant, by means of a DOS, a PLC, a notebook or other handheld tool. Likewise, it is known to conduct the integration offline via a configuration/management system and to integrate the field device then into the automated plant.

Before field devices can be configured or integrated into an automated plant, usually a corresponding project must be established in the configuration/or management system. For this, the structure of the network is defined, as well as the device manufacturer, the field device itself, the different versions of the field device, the function blocks, etc. Depending on the situation, also the device descriptions must be integrated into the configuration/management system. All of these measures are complex and labor and time intensive. Problematic is, furthermore, that the display units associated with the configuration/or management systems, the so-called GUIs, are usually system oriented, i.e. each system provider has its own GUI.

Before an operator can integrate a field device into a network, it is often necessary to instantiate function blocks, which enable accessing of configuration/parameter data. For this, work must be done offline and online.

Problematic is, also, that device descriptions have been preinstalled in the configuration/management systems, which, among other things, no longer describe the current version of the field device to be newly installed. In this case, it is necessary, supplementally, to install the lacking device description. For this, the operator must usually contact the device manufacturer and request the device description. This procedure is relatively time consuming and introduces, moreover, the danger that defective device descriptions get installed.

A further disadvantage of the integration methods known to this point in time is that, in the course of the project, always more information is found to be needed for installation, start-up and configuration of the field device and this must be input by the operating personnel manually via the configuration/management system.

In the non pre-published application DE 10 2009 045 386.5 of the assignee, as filed Oct. 6, 2009, at the German Patent Office, an arrangement is described, in which a field access unit, respectively a fieldbus interface, is so embodied that it continuously monitors the data traffic on the fieldbus. The field access unit has, thus, a listener functionality. Therefore, the fieldbus interface can, without that it itself performs active communication, collect a large amount of information concerning the network management of the automated plant.

Before the above described solution, 'field access unit with listener functionality', so-called gateways had only the function of converting between the different bus protocols at field- and system levels. Thus, at the field level, communication usually occurs via a fieldbus customary in automation technology, while communication at the system level occurs via Internet or intranet.

SUMMARY OF THE INVENTION

The invention starts from a field access unit, which at least has the listener functionality. This functionality is sufficient, when the field device is so embodied that it is accessed directly via a bus protocol, e.g. the Internet protocol. In case different bus protocols are used at the field level and the system level, the field access unit performs the protocol conversion.

An object of the invention is to provide a method and a system, which simplify integration of a field device into an automated plant.

As regards the method, the object is achieved by features as follows:
the service provider provides for each field device a virtual image of the field device in a database, wherein the virtual image describes the field device to be integrated into the automated plant comprehensively relative to its field device specific and application-specific properties in the automated plant;
the service provider transmits to the operator of the automated plant via cloud-computing web services, or Internet based services, automatically or on query, the virtual image of the field device with concrete field device- and application-specific properties at run time (the virtual image is preferably transmitted directly into the field device); and
the field device performs its function in the automated plant, as soon as it is integrated into the network.

Cloud computing (computing in the cloud) is a term from information technology and refers primarily to the approach of providing, via a network, abstracted IT infrastructures, ready program packages and programming environments dynamically matched to need.

As soon as a service provider/device manufacturer has transmitted to the operator of an automated plant an order confirmation, a corresponding account for the operator of the automated plant is opened by the service provider. For this, the configuring of the field devices is performed offline; the corresponding configuration/parameter data for each field device are stored in the database as a virtual image of each field device. The service provider makes available to the operator, or order giver, via Internet the virtual image of each field device. The virtual image is transmitted automatically or upon request by the operator. Preferably, the transmission of the virtual image occurs directly into the corresponding field device. As soon as the field device is integrated into the automated plant and placed in operation, the corresponding virtual image of the field device is provided. Thus, the field device is fully functional directly after installation and start-up in the automated plant.

In order to be able to provide the cloud-computing web-services, the service provider offers, for example, a corresponding software, via which the order can be created and transmitted. After the storing of the virtual images in the database, the operator has access to the virtual images associated with ordered field devices, thus even before delivery of the field devices to the operator. Preferably, the loading of the required virtual images occurs via the field access unit and an OPC-UA server.

An advantageous embodiment of the method of the invention provides that the field access unit, continuously and in predetermined time intervals, uses a listener function to scan, at least in individual bus segments of the data bus, the current live-list, respectively field device configuration, of the corresponding bus segment, respectively of the network, in order to detect current changes in the field device configuration.

Furthermore, it is provided that the field access unit transmits via the automation/integration platform a report to the service provider, as soon as a change of the live-list is detected in the data bus segment, respectively in the network. Thus, also changes in the network achieved after the first installation are directly detected.

A preferred development of the method of the invention provides that the service provider connects itself via the automation/integration platform with the field access unit, as soon as the service provider obtains the report concerning a change in the data bus segment, respectively in the network, so that the corresponding, currently not present, virtual image of the field device is made available via the cloud-computing web service. In case the change involves replacement of the field device by an analogous field device, then the newly installed field device is transmitted the virtual image of the replaced device.

Moreover, according to an advantageous further development of the method of the invention, for the case, in which a customer would like to integrate at least one new field device into the existing network, it is provided that an account for a web based portal associated with the customer is opened by the service provider, or by the field device provider, whereby access to the virtual image of the at least one new field device to be integrated can occur via the Web based portal. The web based portal is, for example, the W@M portal of the E+H group.

An advantageous embodiment of the method of the invention provides that, after transmission of a report from the field access unit to the service provider that the live-list of the field devices in the data bus segment, respectively in the network, has changed, based on unique identification data, a unique setup-, or start-up-configuration associated with each field device, which describes the particular field device comprehensively relative to its field device- and application-specific properties in the automated plant and which is stored in the cloud based web server, is loaded into the corresponding field device. Stored in the database is also information concerning the history of the field device, so that it is available on demand.

Problematic can be the case, in which at least one unknown field device, especially of another manufacturer, is to be integrated into the network, or the case, in which such is detected by the field access unit during a scan. In this situation, it is provided that the unknown field device, which is not mentioned on the account of the customer and which originates from another field device manufacturer than the service provider, is identified based on the live-list. The cloud based Web-server of the service provider adds via the field access unit and the automation/integration platform identification data present concerning the foreign field device to the account of the customer, so that the customer can place the field device in operation via the cloud based Web services.

In case the service provider does not have the information available or cannot obtain such, it is provided that the customer, after obtaining a corresponding report that an unknown field device is integrated in the automated plant and no virtual image exists therefor, performs a configuring of the unknown field device and transmits the configuration data to the cloud based web server of the service provider. In this way, the database is successively expanded.

Moreover, especially advantageous in connection with the method of the invention is when a report is sent from the cloud based server to the operator of the automated plant, as soon as, in the automated plant offline, a change in the configuration/parameter data of one of the field devices has been effected or, when on the manufacturer-side, the original version of the field device has been replaced by a modified/revised version.

An advantageous embodiment of the method of the invention provides that the operator of the automated plant receives notice, when updated configuration/parameter data are ready to be downloaded from the service provider.

In order to assure that all field devices integrated in the automated plant are also stored on the account of the operator of the automated plant, the operator is provided a corresponding synchronizing mechanism.

Furthermore, it is provided that the operator of the automated plant receives a calculation of the services, which it is using at the service provider.

The object is achieved relative to the system of the invention, which works according to the above-described method, by features including that the system comprises at least one field access unit and at least one automation/integration platform, wherein the field devices are connected with one another at the field level via a first data bus, on which communication is running via at least a first bus protocol, wherein the field access unit listens to communication on the first data bus and, for the case, in which communication with the automation/integration platform occurs via at least a second data bus, on which at least a second bus protocol is running, performs conversion of the two bus protocols. Of course, it is also possible that the two bus protocols are identical. The field access unit and its functioning are described in detail in the above mentioned, non pre-published German patent application. The field access unit and the OPC-UA server, respectively the automation/integration platform, are either two components separated from one another, or the two components form a single unit.

Especially advantageous is when the automation/integration platform is an OPC-UA server, which contains a server logic and a logic machine, which forwards the configuration/parameter data describing a field device corresponding to a well-defined information/logic model for a defined type of field device. An OPC server, respectively an OPC-UA server, offers the opportunity to give industrial bus systems and protocols a universal way in which understand one another and is applied where sensors and open and closed loop controlled actuators (field devices) of various manufacturers (or of the same manufacturer) form a common network. With OPC, it suffices to write for each field device, as such was defined in greater detail above, exactly once, an OPC conformed driver, which permits integration without great effort into control and monitoring systems, which can be as large as desired.

Furthermore, it is provided that the data bus is the Internet and/or an intranet and the additional data bus is a fieldbus of automation technology, via which the field devices communicate with the field access unit at the field level. Conventional fieldbusses have already been mentioned above.

BRIEF DESCRIPTION OF THE DRAWINGS

The invention will now be explained in greater detail based on the drawing, the sole FIGURE of which, FIG. 1, is a schematic representation of the way in which the method of the invention works for integrating at least one field device into a network of automation technology, as well as being a schematic representation of the construction of the system of the invention.

DETAILED DISCUSSION IN CONJUNCTION WITH THE DRAWING

The automated plant 1 includes a number of distributed field devices 2, which are connected with one another via a customary automation technology fieldbus 3, on which is running one of the earlier mentioned bus protocols. Accessing of the field devices 2 occurs via the field access unit 4, which is especially a so-called PAP—Plant Access Point. The operation of the PAP 4 will be explained below in greater detail.

The field access unit 4 is connected with an automation/integration platform 5. Both components 4, 5 can also form a single unit. Communication between the field access unit 4 and a web server 6 of a service provider occurs via the automation/integration platform 5, which is preferably an OPC-UA server, and the Internet 7.

The different method variants 1-5 shown in FIG. 1 illustrate the method of the invention and advantageous variants of the method of the invention and will now be described in detail.

1. An operator of an automated plant 1 would like to repopulate the plant, at least in part, with field devices 2 of a field device manufacturer. The operator issues an order for a corresponding project. The service provider creates for each of the desired field devices 2 a virtual image of the field device 2 and makes such available in a database 8. For this, preferably, a universally valid, unique identification code (e.g. GUID or UIID) is associated with each field device 2. The virtual image of the field device 2 describes the field device 2 to be integrated into the automated plant 1 comprehensively relative to its field device specific and application-specific properties in the automated plant 1. The point in time of the creation of the virtual image of each field device 2 to be integrated lies before the point in time of the installation of the field device 2 in the automated plant 1. UUID is an acronym for Universal Unique IDentifier and was standardized by the Open Software Foundation in the standard ISO/IEC11578; 1996. GUID is an acronym for Globally Unique IDentifier of Microsoft and represents, among other names, an implementation variant of Microsoft.

As soon as the field device 1 is integrated into the automated plant 1, the PAP 4 sends via the OPC-UA server 5 a corresponding report to the web server 6 of the service provider, or of the field device manufacturer, and asks for the corresponding virtual image, which subsequently is transmitted via Internet 7 and OPC-UA 5/PAP 4 at run time preferably directly to the field device 2. Thus, the field device 2 has available, directly after start-up, all needed parametering/configuration data, in order immediately to take up its work in the network 9 of the automated plant 1. An essential task of the PAP 4 in the illustrated system constellation is to convert different bus protocols at the field level and at the Internet level into one another.

Of course, delivery of the virtual images of the field devices 2 can also occur upon special request by service personnel on-site.

The providing of the virtual images of the field devices 2 occurs via cloud-computing web services, respectively Internet based services. After transmission of the virtual image into the corresponding field device 2, the field device 2 integrated in the network 9 of the automated plant 1 can immediately assume its function in the automated plant 1. The installation of field devices 2 is, thus, significantly facilitated and can, moreover, occur in an accelerated fashion.

As soon as a customer would like to integrate at least one new field device 2 into the existing network, an account for a web based portal associated with the customer is opened by the service provider, or by the field device provider, whereupon access to the virtual image of the at least one newly field device 2 to be integrated can occur via the Web based portal.

2. The second variant shown in FIG. 1 is for the case, in which a new field device 2; 2' is installed supplementally or as a replacement of a field device 2 already integrated in the automated plant 1. In order also upon the occurrence of such cases to assure frictionless integration, the field access unit 4 scans continuously and in predetermined time intervals, at least in individual bus segments of the network, via a listener function the current live-list, or field device configuration, of the network 9. In this way, current changes in the network configuration are detected. As soon as a change is detected in the network 9, the field device access unit 4 sends via the automation/integration platform 5 a report to the web server 6 of the service provider concerning the discovered field device 2. The web server 6 of the service provider connects via the automation/integration platform with the field access unit 4, as soon as the web server 6 of the service provider receives the report concerning the change in the data bus segment, respectively in the network 9. Immediately, the corresponding, currently not present, virtual image of the field device 2 is made available via the cloud-computing web service.

3. If service personnel change the parametering/configuration data of a field device 2 offline by means of a configuration/management system 10 on-site or remotely, then the PAP 4 ascertains in its next scan the corresponding change in the field device configuration and reports this to the web server 6 of the service provider. The information concerning the changed data is stored in the database 8 under the universally applicable, unique identification code associated with the field device 2. A corresponding report is transmitted from the service provider to the service personnel. In the report, the operator of the automated plant 1 is told that in the automated plant 1 offline a change of the configuration/parameter data of one of the field devices 2 was made.

Likewise, the operator is told when the manufacturer replaces the original version of the field device 2 with a modified/revised version. In this way, the operator of the automated plant 1 is given the opportunity to download the updated configuration/parameter data from the web server 6 of the service provider.

A special case is present when, based on the live list, at least one unknown field device 2 is identified, which is not mentioned on the account of the customer and which originates from another field device manufacturer than the service provider. Then there is the opportunity to have the cloud based Web-server of the service provider obtain via the field access unit 4 and the automation/integration platform 5 present identification data of the foreign field device 2 and to add such to the account of the customer, so that the customer can place also this extra field device 2 in operation via the cloud based Web services.

For the case, in which the operator receives a report from the service provider that there is located in the automated plant an unknown field device 2, for which no virtual image exists, then the operator, or the service personnel, has/have the opportunity to conduct the configuring of the unknown field device 2 on-site and to transmit the configuration data to the web server 6 of the service provider. The data are stored in the database 8 under the GUID or the UIID of the field device 2.

If a field device 2 is replaced by an analogous field device 2', then the configuration/parameter data of the original field device 2 are transmitted into the replacement device 2'.

The invention claimed is:

1. A method for integrating at least one field device into a network of automation technology having a plurality of field devices, which are connected with one another via at least one data bus, on which a bus protocol is running, arranged distributed in an automated plant, wherein accessing of the field devices occurs via a field access unit, which communicates with at least one automation/integration platform and at least one web server of a service provider, the method comprising:
providing for each field device a virtual image of the field device in a database;
the virtual image describes the field device to be integrated into the automated plant comprehensively relative to its field device specific and application-specific properties in the automated plant;
transmitting, preferably at run time, via cloud-computing web services, or Internet based services, automatically or on query, the virtual image of the field device with concrete field device- and application-specific properties into the field device; and
the field device performs its function in the automated plant, as soon as it is integrated into the network;
wherein a report is sent from the cloud based web server to the operator of the automated plant, when, in the automated plant offline, a change in the configuration/parameter data of one of the field devices has been performed or, when on the manufacturer-side, the original version of the field device has been replaced by a modified/revised version; and
wherein the operator is provided with a synchronizing mechanism to assure that all field devices integrated in the automated plant are stored on the account of the operator of the automated plant.

2. The method as claimed in claim 1, wherein:
the field access unit continuously and in predetermined time intervals scans at least in individual bus segments of the data bus via a listener function a current live-list, respectively field device configuration, of the corresponding bus segment, respectively of the network, in order to detect current changes in the field device configuration.

3. The method as claimed in claim 1, wherein:
for the case, in which a customer would like to integrate at least one new field device into the existing network, it is provided than an account for a web based portal associated with the customer is opened by the service provider, or by the field device provider; and
access to the virtual image of the at least one newly field device to be integrated can occur via the Web based portal.

4. The method as claimed in claim 1, wherein:
the operator of the automated plant receives notice, when updated configuration/parameter data are ready to be downloaded from the web server of the service provider.

5. The method as claimed in claim 1, wherein:
the operator of the automated plant receives a calculation of the services, which it is using at the service provider.

6. The method as claimed in claim 2, wherein:
the field device access unit transmits via the automation/integration platform a report to the service provider, as soon as a change of said live-list is detected in the data bus segment, respectively in the network (9).

7. The method as claimed in claim 6, wherein:
the service provider connects itself via the automation/integration platform with the field access unit, as soon as the service provider obtains the report concerning the change in the data bus segment, respectively in the network, so that the corresponding, currently not present, virtual image of the field device is made available via the cloud-computing web service.

8. The method as claimed in claim 3, wherein:
after transmission of a report from the field access unit to the service provider that said live-list of the field devices in the data bus segment, respectively in the network has changed, based on unique identification data, a unique setup-configuration associated with each field device, which describes the particular field device comprehensively relative to its field device specific and application-specific properties in the automated plant and which is stored in the cloud based web server, is loaded into the corresponding field device.

9. The method as claimed in claim 3, wherein:
for the case, in which, based on the live list, at least one unknown field device is identified, which is not mentioned on the account of the customer and which originates from a field device manufacturer other than the service provider, the cloud based Web-server of the service provider adds via the field access unit and the automation/integration platform identification data present concerning the foreign field device to the account of the customer, so that the customer can place the field device in operation via the cloud based Web services.

10. The method as claimed in claim 9, wherein:
the customer, after obtaining a corresponding report that an unknown field device is integrated in the automated plant and no virtual image exists therefor, performs a configuring of the unknown field device and transmits the configuration data to the cloud based web server of the service provider.

11. A system with a plurality of field devices of automation technology for performing a method for integrating at least one field device into a network of automation technology having a plurality of field devices, which are connected with one another via at least one data bus, on which a bus protocol is running, arranged distributed in an automated plant, wherein accessing of the field devices occurs via a field access unit, which communicates with at least one automation/integration platform and at least one web server of a service provider,
the method comprising:
providing for each field device a virtual image of the field device in a database; the virtual image describes the field device to be integrated into the automated plant comprehensively relative to its field device specific and application-specific properties in the automated plant; the service provider transmits, preferably at run time, via cloud-computing web services, or Internet based services, automatically or on query, the virtual image of the field device with concrete field device and application properties into the field device; and the field device performs its function in the automated plant, as soon as it is integrated into the network; wherein a report is sent from the cloud based web server to the operator of the automated plant, when, in the automated plant offline, a change in the configuration/parameter data of one of the field devices has been performed or, when on the manufacturer-side, the original version of the field device has been replaced by a modified/revised version; and wherein the operator is provided with a synchronizing mechanism to assure that all field devices integrated in the automated plant are stored on the account of the operator of the automated plant;
the system comprising:
at least one field access unit; and
at least one automation/integration platform, wherein:
said field devices are connected with one another at the field level via a first data bus, on which communication is running via at least a first bus protocol;
said field access unit listens to communication on said first data bus and, when communication with said automation/integration platform occurs via at least a second data bus, on which at least a second bus protocol is running, performs conversion of the two bus protocols.

12. The system as claimed in claim 11, wherein:
the automation/integration platform is an OPC-UA server, which contains a server logic and a logic machine, which forwards the configuration/parameter data describing a field device corresponding to a well defined information/logic model for a defined type of field device.

13. The system as claimed in claim 11, wherein:
the data bus is the Internet and/or an intranet and the additional data bus is a fieldbus of automation technology, via which the field devices communicate with the field access unit at the field level.

* * * * *